United States Patent Office 2,697,070
Patented Dec. 14, 1954

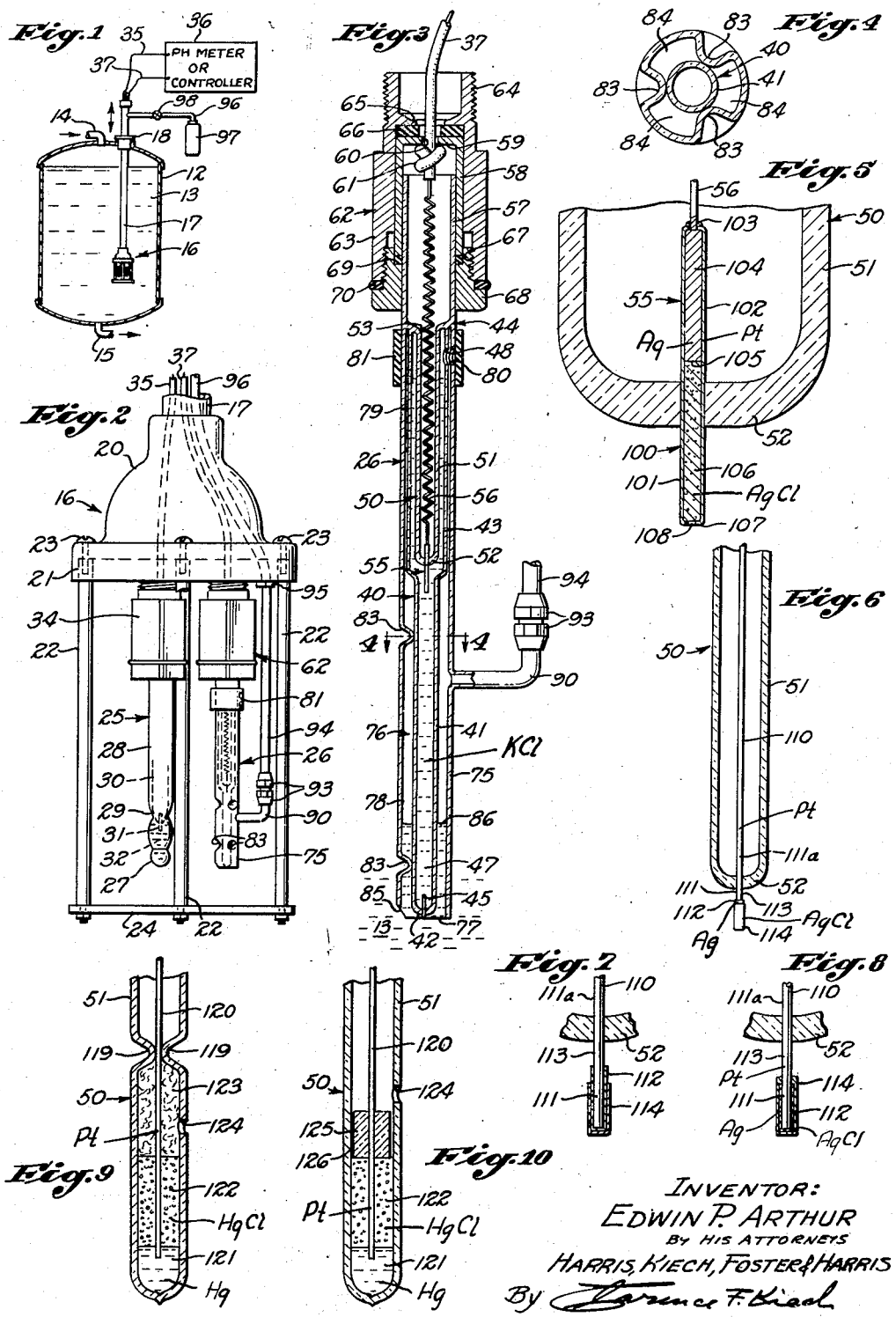

2,697,070

ELECTROCHEMICAL APPARATUS

Edwin P. Arthur, Altadena, Calif., assignor to Beckman Instruments, Inc., South Pasadena, Calif., a corporation of California Application January 23, 1951, Serial No. 207,415

23 Claims. (Cl. 204—195)

My invention relates to electrochemical testing or control and more particularly to a novel pressure-equalized reference electrode structure and to a novel half-cell construction particularly useful therewith or with other electrochemical apparatus.

In electrochemical measurements a reference electrode is commonly employed in conjunction with a measuring electrode, for example, a glass electrode immersed in the test solution, the potential between the two electrodes being a function of the concentration of a specific ion or ions, for example the concentration of hydrogen or hydroxyl ion in the solution. Such an arrangement forms the basis of the so-called pH meter which is widely used for evaluation and control of pH of static or flowing solutions.

The reference electrode usually comprises an internal half-cell structure supported within a tube filled with an electrolyte, typically a salt solution. The tube of salt solution is characterized as a "salt bridge," i. e., it forms an electrical bridge between the half-cell and the sample or test solution. Electrical connection between the salt solution and the sample or test solution is made by liquid contact via a suitably formed aperture or passage in the salt-containing tube. At times the entire unit consisting of the internal half-cell structure, the tube, the salt solution, and the liquid-junction-forming means is referred to as a "half-cell," but the present invention can best be exemplified by using the more accurate terminology outlined above.

The internal half-cell structure establishes a reference potential which need not be and usually is not zero with respect to the test solution but which should remain constant throughout the life of the half-cell. Usually, the reference potential is obtained by use of a metal in electrochemical equilibrium with one of its salts.

A conventional form of calomel electrode, for example, has a glass tube closed at its lower end with a wad of fibrous material filling this lower end and supporting a compacted column of mercury salt which in turn supports a pool of mercury into which dips the wire that is to be connected to the reference terminal of the pH meter, for example. The mercury salt is commonly mercurous chloride, i. e., pure calomel, or a mixture of calomel and mercury, and is present as a body of powder resting upon the wad. The tube wall provides an opening for ionic communication between an external electrolyte and the calomel, the wad of fibrous material and the calomel powder becoming saturated with the electrolyte but the fibrous material being designed to space the calomel from the tube opening.

Such a calomel reference electrode is physically unstable, particularly at high temperatures, for various reasons. First, it will be observed that the components are assembled in the order of increasing density, going from the bottom upward, i. e., electrolyte, calomel and mercury. Also, at high temperatures the solubility of the calomel increases greatly, as does its tendency to diffuse downward and outward of the half-cell tube. Additionally, cycling through wide temperature changes causes the contents to "breathe" through the half-cell aperture. All these effects combine to cause progressive deterioration of the previously compact mass of calomel with consequent loss of support of the body of mercury. Ultimately the mercury descends into or filters through the calomel to break contact with the wire.

In accordance with prior understandings in the art, it would be unthinkable to dispose the body of mercury at the bottom of the tube, with the calomel thereabove, because the wire would then depend through the electrolyte and the calomel in contact therewith before dipping into the mercury and, in accordance with prior understandings, would not be at a potential reliably determined entirely by the mercury-calomel interface but at some potential influenced at least in part by its own contact with the electrolyte or the calomel. At best, it would be considered that such a wire would necessarily be spaced from contact with any material superimposed above the mercury pool, as by being surrounded by a glass sheath or otherwise separated from such material.

I have unexpectedly found that spurious potentials are not introduced by direct contact between such electrochemically active and electrochemically inactive materials; for example between a mercury salt or the electrolyte media usually employed, and a wire made of platinum or other inert metal and depending into a pool of mercury beneath the material.

It is an object of the invention to provide a half-cell in which a wire of inert material electrically contacts a body of metal and extends through and is exposed to contact with a salt of that metal and an electrolyte on its way to electrical contact with the body of metal. Another object is to provide a calomel half-cell including a pool of mercury which is in the closed lower end of a tube, a body of mercury salt thereabove, and a body of electrolyte above the mercury salt, the electrolyte preferably also saturating the mercury salt, and with a metal wire or member depending through the electrolyte and the mercury salt and exposed to direct contact therewith, the lower end of the wire dipping into the mercury pool.

Another type of reference electrode, better suited to high-temperature use, derives its reference potential from a system comprising silver in electrochemical equilibrium with a silver salt, e. g., silver chloride. For example, it has previously been proposed to seal a wire of inert metal, e. g., platinum, in the bottom of a tube to provide an outer section beyond the tube wall and an inner section within the tube and connected through a suitable cable to the reference terminal of a pH meter. The outer section was coated with silver oxide powder which was then converted into silver in the reducing portion of a flame, and the silver was then coated with silver chloride fused in place and extending into contact with the glass wall to avoid all direct contact between the platinum wire and the surrounding electrolyte, usually a salt solution used as a bridge to the liquid junction to be described. However, the heat required to reduce the silver oxide, and the high melting point of the silver chloride (around 455° C.) necessary to fuse it, necessitated developing such temperatures in the glass at the wire-glass junction as to set up strains therein leading to immediate or incipient cracks in the glass or danger of future cracking while in use.

I have unexpectedly found, however, that the outer section of such a wire can be coated merely locally with the silver and silver salt, leaving a portion of the wire openly exposed to the electrolyte, without setting up any spurious potential and while giving a very stable, easily manufactured and long-lived half-cell structure for use as a part of a reference electrode structure or in other electrochemical apparatus. For example, the outer section of such a wire, formed of platinum or other inert metal, can be locally coated with silver, the silver being then at least partially coated or covered with a silver salt, such as silver chloride, fused in place. The coating of silver chloride does not extend to the glass but terminates short thereof to leave a section of the inert-metal wire openly exposed to the electrolyte. The silver chloride can thus be fused without developing glass-straining temperatures in the glass. Also, the openly-exposed section of the wire has unexpectedly been found not to set up any spurious, competing potential interfering with the constancy of the reference potential derived from the electrochemical equilibrium of the silver-silver chloride combination.

It is an object of the invention to provide a novel half-cell structure in which a metal element or member carries contacting masses, firstly, of a different, electrochemically-active metal and, secondly, of a salt of the latter metal, these masses being localized to leave an adjacent portion of the metal element or member exposed to contact with an electrolyte.

It is another object of the invention to provide a silver-silver chloride electrode or half-cell structure adapted to contact an electrolyte and in which structure the silver and silver chloride are in contact with each other, being supported by a conducting element of inert metal which conducting element is also in contact with the electrolyte.

A related object is to use a tube of inert metal for the supporting or conducting element, the contact between the electrochemically-active metal, e. g., silver, and its salt, e. g., silver chloride, being within the tube.

In this connection, I have found it possible to make an extremely sturdy and efficient half-cell structure in which a small tube of inert metal is sealed in a wall of water-impervious material, typically glass, leaving one portion of the tube exposed to direct contact with the electrolyte, the tube containing contacting bodies of the electrode metal, e. g., silver, and a salt of such metal, e. g., silver chloride, the salt being in ionic communication with the electrolyte. It is an object of the invention to provide such a half-cell structure.

It is a general object of the invention to provide an electrochemical half-cell including an electrochemically-active metal, a salt furnishing ions of said metal to produce a condition of electrochemical equilibrium therewith, a polar medium, and a metal conductor in contact with the polar medium. The polar medium may or may not contain a dissolved electrolyte employed in addition to the salt, as for example with a half-cell in which a body of silver is suspended in a silver nitrate solution by a conductor which is exposed for contact with the solution.

Another general object of the invention is to provide an electrochemical half-cell including contacting masses of electrochemically-active metal and a salt of this metal, at least the salt being exposed for contact with an electrolyte, with an electrical conductor providing one portion contacting the mass of metal and another portion exposed for contact with the electrolye.

The complete reference electrode should, as mentioned above, include a salt bridge connecting the half-cell structure to the medium being tested. The aforesaid electrolyte or salt solution is usually the liquid forming this salt bridge, and the liquid junction is used to provide ionic communication with the medium being tested. The aforesaid aperture or passage of the salt-bridge tube, producing the liquid junction, may be formed in various ways, as by the use of the herein-illustrated wick or fibrous element traversing the wall of this tube, by using a ground-glass joint separating the salt solution and the test medium, or by using any other suitable junction means.

The liquid junction behavior should be substantially independent of the character of the test solution and must give substantially reproducible potentials. It is distinctly preferable that the liquid junction be continuously renewed by flowing the salt solution as a minute stream into the medium being tested and thus establish a continuously-renewed interfacial or liquid-junction zone. This requires that the salt solution feeding the junction should be under slightly higher pressure than the medium into which it discharges. In making electrochemical measurements at atmospheric pressure, it is relatively easy to produce this small pressure differential by maintaining the level of the salt solution within the salt-bridge tube a small distance above the level of the medium being tested. Heretofore this has not been possible in pressured systems.

It is often desirable to determine ion concentrations in pressure tanks, reservoirs, jacketed kettles, retorts and the like which are frequently used in carrying out industrial chemical reactions where of necessity the pressure is high and often variable, sometimes as a result of temperature change. It has heretofore been proposed to take so-called grab samples from the pressured vessel, reducing the pressure thereon and testing them at atmospheric pressure, or to withdraw a stream from the vessel, testing it at atmospheric pressure and pumping it back into the vessel. While a continuously-renewed liquid junction can be used with such an arrangement, such proposals are costly or time-consuming and are limiting to the convenient use of the electrode. It has also been proposed to use as a liquid junction a ground-glass joint in a completely liquid-filled and otherwise totally-sealed reference electrode when submergence in the high-pressure medium is required, relying upon diffusion to effect contact between the internal and external solutions. This is not entirely satisfactory because the medium being tested will sooner or later diffuse into the salt solution, leading to relatively short life, as a result of destructive contamination of the electrode, and erroneous results because of an unreliable liquid junction.

It is an object of the invention to provide an apparatus incorporating a liquid junction and which can be submerged at any depth in the medium being tested, while still insuring a continuous flow of salt solution into the medium to provide a continuously-renewed liquid junction. It is a further object of this invention to provide such a pressure-insensitive apparatus which will also be operable when the pressure is lower than, rather than higher than, atmospheric pressure.

Another object is to provide a novel electrochemical-cell structure which can incorporate a pH sensitive electrode and a reference electrode, if desired, and which can be raised and lowered in a liquid body to explore the pH thereof at various levels, or which can be fixed in submerged position to permit testing over prolonged periods of time and irrespective of change in pressure at the depth of submergence.

Another object is to provide a reference electrode structure or a liquid junction which can function under pressure and temperature variations and independently of physical movement of the medium being tested.

A further object is to provide a reference electrode structure allowing pressure equalization between the interior and exterior thereof. Another object is to maintain a substantially constant pressure differential across a liquid junction of a salt-bridge tube by raising and lowering the pressure on the salt solution as the pressure exterior of the tube rises and falls but while maintaining a small hydrostatic pressure head on the salt solution regardless of such change in pressure.

These results are preferably accomplished by disposing between the salt solution and the external medium a space occupied by a fluid substantially immiscible with the salt solution and the external medium, yet which is displaceable or compressible to transfer pressure therebetween. It is an object of the invention to provide a fluid body functioning in this connection.

The preferred intermediate fluid is a gas, present as a body that is trapped in a sheath of the reference electrode structure as the same is being submerged. It is an object of the invention to provide such a structure; also a structure in which the sheath surrounds and protects a portion of the reference electrode structure, typically the salt-bridge tube thereof.

The gas initially trapped in such a sheath will be compressed upon increase in external pressure, as by increased submergence. It is an object of the invention to provide a relatively wide space in which the interface between the external medium and the gas may initially rise, and a relatively narrow space thereabove which communicates with and transfers pressure to the salt-bridge tube.

Further objects and advantages of the invention will be evident to those skilled in the art from the following description of exemplary embodiments.

Referring to the drawing:

Fig. 1 is a view diagrammatically showing the invention arranged for exploring the pH of a pressured medium in a closed vessel;

Fig. 2 is an enlarged view of the submergible element of Fig. 1;

Fig. 3 is a vertical sectional view of a reference electrode structure incorporating a silver-silver chloride half-cell;

Fig. 4 is a cross-sectional view taken along the line 4—4 of Fig. 3;

Fig. 5 is an enlarged sectional view of the silver-silver chloride half-cell of Fig. 3;

Fig. 6 is an enlarged sectional view of an alternative silver-siiver chloride half-cell structure;

Fig. 7 is an enlarged sectional view of the half-cell of Fig. 6, the thickness of the coatings being shown out of scale for purpose of clarity;

Fig. 8 is an enlarged sectional view of an alternative half-cell related to that of Fig. 7 and similarly distorted in scale;

Fig. 9 is a vertical sectional view of a calomel electrode of the invention; and Fig. 10 is an enlarged sectional view of an alternative form of calomel electrode.

Referring particularly to Fig. 1, a pressure-type vessel 12 is shown as containing a body 13 of the medium to be tested. This body may be a static one, maintained in the vessel 12 at atmospheric or higher or lower pressure, or it may be a continuously-renewed body if additional medium is added through a pipe 14 and withdrawn through an effluent pipe 15.

A submergible element 16 is carried by a pipe 17 which can slide through a gland structure 18 to raise and lower the submergible element 16, e. g., to test the pH of the body 13 at various levels. This submergible element is exemplified in Fig. 2 as including a dome member 20 connected to the pipe 17 and providing a flange 21 from which a plurality of rods 22 depend, these rods being held in place by screws 23. The lower ends of the rods 22 are connected to and spaced by a protective plate 24. The space within the peripherally-disposed rods 22 and between the flange 21 and the plate 24 contains a glass electrode structure 25 and a reference electrode structure 26, protected from injury by the plate 24 and the rods 22.

The glass electrode structure 25 may be of any desired form, being shown as including a bulb 27 of pH-sensitive glass blown on a glass tube 28 below a restriction 29. An internal glass tube 30 is sealed at the restriction 29 and carries an electrical contact means 31 which may be one of the half-cells of the invention and which dips into a body of electrolyte 32 filling the interior of the bulb 27 and substantially filling the adjacent portion of the tube 28 below the restriction 29. The glass electrode structure 25 is retained in a mounting means 34 which may be similar to that hereinafter described. The contact means 31 is connected to a suitable cable 35, the conductor of which is connected to one terminal of a pH meter or controller 36, shown in Fig. 1. The other terminal of this meter or controller is connected by a cable 37 to the reference electrode structure 26. Both of the cables 35 and 36 extend upwardly through the pipe 17.

Referring particularly to Fig. 3, the reference electrode structure 26 includes a salt-bridge tube 40 comprising a smaller-diameter, lower portion 41 substantially closed at its lower end by a wall 42 and providing an upper portion 43 of larger diameter which depends from a junction structure 44. Any suitable liquid junction means is provided at the wall 42, illustrated as a wick 45 formed of fibrous material and extending through a minute opening of the wall 42 so that its exterior portion is in contact with the medium 13 and its internal portion contacted by a body of electrolyte 47 within the lower and upper portions 41 and 43 and having a level somewhat below a passage means shown as including an opening 48. This opening serves both to insert the electrolyte, typically a salt solution such as a saturated solution of potassium chloride, and to transmit to the body of electrolyte 47 the pressure variations at the depth of submergence, although these functions can be served by separate openings if desired.

Depending in the upper portion 43 of the salt-bridge tube 40 is a half-cell structure 50 constructed in accordance with any of the embodiments of the invention and shown in Fig. 3 as including a glass tube 51 having a lower dome end 52 and a flared upper end 53 connected to the junction structure 44 in fluid-tight relationship. The lower dome end 52 is shown as traversed by a silver-silver chloride half-cell 55, illustrated in Fig. 5, with its internal end connected to a coiled spring-like conductor 56.

Extending upwardly from the junction structure 44 is a tubular neck 57 to which is adhered a cap 58 formed of conducting or non-conducting material, this cap providing an upper wall 59 having an opening 60 therein. The cable 37 extends through the opening 60 and is tied in a knot 61 immediately therebelow, the conductor of this cable being electrically connected to the coiled spring-like conductor 56. This conductor is expansible in length, permitting its upper end to be connected with the conductor of the cable 37 while the cap 58 is withdrawn from the neck 57. Thereafter, the cap is lowered over and secured to the neck 57, the coiled conductor 56 contracting and remaining taut.

The cap 58 is secured in a mounting means 62 shown as including a coupling member 63 having an upper externally-threaded neck 64 which threads into a corresponding opening of the flange 21 and which provides a shoulder 65 separated from the wall 59 by a compressible gasket 66. The lower end of the coupling member 63 provides a threaded counterbore 67 receiving a gland member 68. A compressible gasket 69 is disposed between a shoulder of this gland member and the lower end of the cap 58. Similarly, a compressible gasket 70 is disposed between the gland member and the lower end of the coupling member 63. Tightening the gland member 68 thus compresses the gaskets 66 and 69 against the cap 58 and also compresses the gasket 70 to provide an adequate seal against inflow of the medium 13.

The invention includes a suitable pressure-transfer means between the medium 13 and the electrolyte 47 to change the pressure on the electrolyte with any change in pressure of the medium 13. This means is shown as including a sheath 75 depending from the junction structure 44 in spaced relationship with the periphery of the salt-bridge tube 40 to form an annular chamber 76 communicating at its lower end with the medium 13. This communication is preferably acomplished by use of a sheath having an open lower end 77 preferably terminating adjacent and in protective relationship with the wall 42 and its liquid-junction element. The annular chamber 76 includes an enlarged lower portion 78 around the lower portion 41 of the salt-bridge tube and a smaller upper portion 79 around the upper portion 43 of the salt-bridge tube, this upper portion 79 openly communicating with the opening 48.

The passage means to the interior of the salt-bridge tube preferably also includes an opening 80 in the sheath 75 aligned with the opening 48 and closed by a wide rubber band 81 or other sealing means which can be displaced downward or distended manually away from the opening 80 to permit initial filling or refilling of the salt-bridge tube with the electrolyte 47, which initially is at a level only slightly below the opening 48.

Suitable means is preferably provided to align the lower portions of the salt-bridge tube and the sheath 75 and also to bring these portions into mutually supporting relationship. This means is shown as including two series of dimples 83, each series representing a plurality of inward indentations in the sheath 75 to bring the indented portions closely adjacent the periphery of the lower portion 41 of the salt-bridge tube 40, while leaving passages 84 between the dimples.

The tubes 40 and 51, the neck 57 and the sheath 75 may be formed of any suitable water-impervious material of a non-conducting character but are preferably made of glass fused integrally at the junction structure 44.

Assuming that the reference electrode structure is initially in an air or other gaseous zone above the medium 13 in a pressured container, it will be apparent that correspondingly-pressured air or other gas will fill the annular chamber 76 and that this pressure will be applied to the top of the column of electrolyte 47. The hydrostatic head of this column will insure a minute flow of the electrolyte from the lower end of the salt-bridge tube through the wick 45. If the reference electrode structure is lowered so that the lower end of the wick 45 contacts the medium 13, the outflow of the electrolyte, typically a salt solution, will establish the aforesaid continuously-renewed liquid junction.

If the reference electrode structure is lowered beneath the surface of the medium 13, the air in the annular chamber 76 will be trapped therein. It is preferable to permit the medium 13 to rise minutely in the lower end of the sheath 75 to submerge the wall 42 before the air entrapment begins. This is preferably accomplished by providing one or more notches 85 in the lower open end 77 of the sheath 75. Fig. 3 illustrates one of these notches, formed merely by locally grinding the lower open end 77 at an angle.

As the depth of submergence increases, the medium 13 will rise somewhat in the lower portion 78 of the annular chamber 76, forming an interface 86 which compresses the air in this lower portion 78 and in the upper portion 79 of the annular chamber, the increased pressure being transmitted to the top of the column of electrolyte 47 to maintain the top of this column at a pressure substantially equal to the pressure at the depth of submergence. At the same time there will remain a small pressure differential across the wall 42 as a result of the hydrostatic head of the column of electrolyte and effective to establish the minute outflow of electrolyte to renew the liquid junction.

It is a distinct advantage to have the lower portion 78 of the annular chamber 76 substantially larger in cross-sectional area than the upper portion 79 thereof. It is desirable to keep this upper portion 79 and the air space above the column of electrolyte 47 volumetrically small as compared with the lower portion 78 of the annular chamber 76. This minimizes rise in the interface 86 with a gain in pressure and makes it possible to use the reference electrode structure even when the medium 13 is subjected to extreme changes in pressure. Thus, since the combined volume of the upper portion 79 and the space above the electrolyte is minute as compared to the lower portion 78, it will be seen that extremely high pressures would be required to raise the interface 86 even level with the upper end of the narrow portion 41 of the salt-bridge tube. Consequently, even at very high pressures it is easy to maintain the top of the electrolyte 47 always higher than the interface 86, thereby assuring outward flow of electrolyte through the wick 45; nor is there ever any danger of the interface 86 rising to the level of the opening 48. The upper portion 79 is exaggerated in cross-sectional area in the showing of Fig. 3 for purpose of clarity. This portion 79 need be no more than the minute space present when the upper portion 43 of the salt-bridge tube forms a slip fit with the interior of the sheath 75.

It will be apparent that fluid media other than air can be used as the pressure-transferring means. For example, if the medium 13 is an aqueous liquid, the pressure-transferring medium may include a layer of oil above the interface 86 and separating this interface from a gas in the annular chamber 76. This means may be used, for example, to minimize dissolving of air or the gas into the liquid medium 13 at the interface 86. Even if the pressure-transferring medium is exclusively a gas, it need not be air as any other suitable gas can be employed such as carbon dioxide or nitrogen, or such other gases as occur in the pressurized chamber above the body of liquid medium 13 and serve to fill the annular chamber 76 before the electrode is lowered into said body of liquid medium 13.

By proper design, the leakage of electrolyte at the liquid junction is so small that the reference electrode structure can operate for extended periods of time without refilling the salt-bridge tube. Such refilling can be effected between tests by displacing the rubber band 81 and adding additional electrolyte through the aligned openings 48 and 80. The rubber band should then be replaced. Opposite the opening 80, the rubber band is subjected to substantially equal pressures on its opposed sides, wherefore there is no tendency for leakage.

It is apparent that the electrode structure of Fig. 3 will also be useful when the pressure in the tank falls below atmospheric pressure. In this case a certain amount of the air or gas in the chamber 76 will be vented at the bottom of the sheath 75 while the electrode remains operable by virtue of the hydrostatic head of electrolyte 47 above meniscus level 86.

If it is desired periodically to renew the electrolyte while the reference electrode structure remains under pressure, or if it is desired to introduce additional pressure-transferring media into the annular chamber 76, suitable supply means can be employed for this purpose. Figs. 1–3 illustrate a supply means by which additional pressure-transferring media can be supplied to the annular chamber 76 to lower the interface 86 and thus compensate for any very large increase in pressure, such as may have caused this interface to approach the upper end of the lower portion 78 of the annular chamber 76. This means includes a tube structure 90 secured to the sheath 75 and communicating with the lower portion 78 of the annular chamber 76. A coupling 93 connects the tube structure 90 to a short pipe 94 which extends to a fitting 95 carried by the flange 21 and connecting with a small pipe 96 which extends upward in the pipe 17 and thence outward, as suggested in Fig. 1, to connect to a container 97. This container may be a storage container for holding additional gas, for example, under pressure, the gas being supplied to the annular chamber 76 upon opening of a needle valve 98. Any excess gas thus supplied will merely bubble upwardly through the medium 13 after lowering the interface 86 to a position determined by the notch or notches 85. The pipe 96 can also be used to supply other fluids to the annular chamber 76, for example to supply the oil mentioned aforesaid as forming a layer above the interface 86.

While the half-cell structure 50 may be variously constructed, using, for example, mercury in contact with calomel or a silver-silver chloride arrangement, the latter is preferred as a part of the reference electrode structure 26. This is particularly true if the reference electrode structure is to be used at high temperature, a condition found in practice to occur with particular frequency in association with high pressure. Half-cells of the type herein described are thus preferred in this particular reference electrode structure, because there is no tendency in the forms shown in Figs. 5, 7 and 8 for the wall or lower domed end 52 of the half-cell structure to crack when subjected to wide temperature changes, which occurred as a consequence of the older and unsuitable methods of fabrication previously explained. Nor is there any tendency of the half-cell to deteriorate as a result of cycling through a wide range of temperature, as is characteristic of former calomel half-cell constructions. Nor is there the greatly emphasized destructive "breathing" of electrolyte, characteristic of former calomel half-cells when a bubble of gas or air is trapped in the half-cell tube and the structure is subjected to widely varying pressures.

The preferred silver-silver chloride half-cell 55 illustrated in Figs. 3 and 5 is quite unconventional in design and offers additional advantages particularly for use with the electrode structure of Figure 3. It includes a conducting or supporting element in the shape of a small tube 100 sealed in the lower domed end 52 of the tube 51 to form a fluid-tight junction. A lower section 101 of the tube 100 is exposed to the external electrolyte 47. An upper section 102 of the tube 100 is exposed to the interior of the tube 51, providing an upper end which may be swaged inwardly and soldered at 103 to the lower end of the conductor 56. The tube 100 is made of an inert metal, such as platinum, this metal being inert to the electrolyte and inert in the sense of being effectively inert electrochemically.

In the upper end of the tube 100 is an electrochemically-active mass of metal 104, shown as a plug or filling of pure silver, which provides an end face 105. The mass of metal 104 electrically contacts the tube 100 and may additionally contact the wire 56 as by silver soldering at 103. The end face 105 is in contact with a mass 106 of a salt of the same metal of which the mass 104 is composed, here illustrated as a mass of silver chloride inserted in powder form to fill the lower section 101, the powder being then heated to fuse it. The extreme lower end of the tube 100 may be swaged over at 107 to leave an opening 108 and assist in holding the mass 106 in place, or the lower end of the tube 100 may be left completely open. The external electrolyte has access to the mass 106 through the opening 108. The reference potential is established substantially at the face 105 because of the contact between the silver and the silver chloride. In this embodiment it will be noted that the lower section 101 of the inert-metal tube 100 is directly exposed to the electrolyte. This is true both as to the external surface of such lower section and, because of exposure to the electrolyte through the opening 108, as to the interior of this lower section 101, to the extent that the sintered mass of salt may remain partly porous.

In addition, the inert-metal tube 100 is apparently in electrical contact both with the body of silver 104 and the body of silver chloride 106, yet constant and accurately reproducible reference potentials are obtained from this half-cell. In addition, this type of half-cell is extremely compact and sturdy and is believed to represent the first half-cell in which the electrochemically-active metal and its salt are in contact in a metallic tube.

Another type of compact silver-silver chloride half-cell is illustrated in Fig. 6 and includes a conducting or supporting element in the form of a wire 110 of inert metal, such as platinum, sealed in the lower domed end 52 of the tube 51 and providing a lower section 111 and an upper or inner section 111$^a$, best shown in Figs. 7 and 8. In Fig. 7 a portion of the lower section 111 is coated with pure silver to form a mass or coating 112. This is accomplished most conveniently by dipping into silver oxide powder and heating in the reducing portion of a flame, whereupon the silver oxide is reduced to silver. However, this coating is applied merely locally and leaves exposed to the surrounding electrolyte an exposed portion 113 of the wire 110. In Fig. 7 a portion of the mass or coating 112 is then covered with a mass or coating 114 of silver chloride, applied by any suitable method, such as dipping into silver chloride powder and fusing in a flame. By this arrangement, a portion of the mass or coating 112 is also left exposed to the surrounding electrolyte, as would seem to be called for on the basis of known electrochemical principles.

It has been found, however, that, even if the mass or coating 14 of silver chloride encompasses the mass or coating 112 completely, as suggested in Fig. 8, the half-cell is still quite operative and satisfactory. In either instance the coatings 112 and/or 114 are not extended into contact with the lower domed end 52 of the tube 51, leaving the aforesaid exposed portion 113 bare. This has desired advantages, because the silver oxide layer can be reduced and the silver chloride layer can be fused in place without imparting glass-straining temperatures to the lower domed end 52, thus making for a sturdy and fluid-tight junction which will not develop cracks during later use at a time when such failure may be very costly.

The principles of the invention can also be incorporated in a calomel half-cell of novel construction, as suggested in Figs. 9 and 10. In Fig. 9 the lower end of the tube 51, here assumed to be made of glass, is sealed off and the tube is formed to provide a constriction 119 which receives the conductor in the form of wire 120 of inert metal, such as platinum. This wire dips into a pool of mercury 121 in the extreme lower end of the tube 51. Above and in contact with the mercury is a body of pure calomel or a mixture of calomel and mercury, hereinafter referred to as a calomel body 122. In Fig. 9 a mass of glass wool 123 is disposed above the calomel body 122, filling the space thereabove to the constriction 119. The tube 51 provides an opening 124 for ionic communication with the exterior and preferably disposed opposite the pad or mass of glass wool 123. The conductor 120 may be sealed in the constriction 119.

In making the calomel electrode of Fig. 9, the constriction 119 is first produced in an open-ended glass tube, and the platinum wire 120 is then sealed in place at the constriction. The tube is up-ended, and the pad of glass wool 123 is inserted, after which the calomel body 122 is inserted. The now-upper end of the glass tube is heated preparatory to sealing, which is accomplished after the mercury 121 has been inserted. Sealing of the glass tube presents no unusual problem in glassworking because of the opening 124 which equalizes any pressure or volume change during the sealing of the tube.

The tube is now inverted to its normal position, and the internal elements gently shaken. The mercury is in its natural position at the bottom of the tube by reason of its high density and the wire 120 dips therein. The lower-density calomel body is in a stable position above the denser mercury, and the glass wool 123 completes the filling components. To condition the half-cell for service and bring it to electrochemical equilibrium, it is placed in a closed container, and a major portion of the air therein is removed and replaced by an electrolyte, usually a saturated solution of potassium chloride, following which the half-cell is ready for use.

In Fig. 10 the arrangement is generally similar, except that the pad 123 is replaced by a bead 125 of glass or other material, which may be of any suitable shape and preferably occupies substantially the entire internal cross-sectional area of the tube 51, leaving only a minute peripheral passage 126, shown of exaggerated width in Fig. 10. The opening 124 is desirably positioned slightly above the bead 125 in this embodiment. The tube 51 can be constricted above the bead 125 if desired. Likewise, it is possible to seal the wire 120 in the bead 125, whereby the latter acts as a positioning means for the wire. The bead 125, like the body of glass wool 123 of Fig. 9, acts as a physical barrier which substantially prevents admixture of the ions of the active metal, e. g., mercury with the salt bridge fluid, e. g., potassium chloride.

In the calomel half-cells of Figs. 9 and 10, the tube 51 need not be formed of glass but can be made of any water-impermeable material, such as any of the well-known plastics. Furthermore, the tube 51 could be made of an inert metal such as platinum or palladium, in which case the internal wire becomes superfluous. The constriction 119 could then be made by pinching the tube completely together. Above the constriction 119 a conductor terminal could be soldered or connected in any conventional manner.

Consider now and in more detail the unexpected aspect of the successful operation of the half-cell structures exemplified in Figs. 5 and 7-10, in which an inert conductor is permitted to contact elements of the half-cell such as the ion-furnishing salt and the electrolytic medium, in addition to the electrolytically-active metal. Taking the functioning of the structure of Fig. 9 or Fig. 10 as an example, let us consider the misgivings which have prevailed in the past, based on the ordinary practices and understandings of the prior art, that the platinum wire might enter into ionic reaction with the mercurous ions present in the calomel suspension 122, or with the essentially pure potassium chloride solution. In the case of the mercurous ions, we might postulate yielding of electrons by the wire to the ions, to produce the reaction.

(1) $$Hg^+ + e \rightarrow Hg$$

This is seen to require deposition of metallic mercury on the wire, so that the equilibrium potential, as before, would be merely that of a mercury-mercurous ion cell. The possibility that chloride ions will yield electrons to the wire by an interfering reaction such as (2) $$2Cl^- \rightarrow Cl_2 + 2e$$

must likewise be dismissed. Decomposition of the chloride to produce free chlorine is characterized by much higher potentials than the available reaction (3) $$Hg \rightarrow Hg^+ + e$$

which likewise furnishes ions. Consequently, Equation 3 would have to proceed until the supply of metallic mercury were completely exhausted before Equation 2 could occur, the process moreover requiring a magnitude of charge transfer entirely meaningless in reference half-cell applications.

Considering the same wire in contact, in a separate zone, with the pure potassium chloride solution, there is likewise no available mechanism which can be postulated whereby electrons can be taken up by the wire from the solution, or yielded to the solution by the wire, in competition with the primary cell reaction between mercury and mercurous ion.

One might acknowledge, of course, that a mechanism for electron transfer, however slender, is in fact always provided wherever the wire contacts an aqueous medium. This occurs to the extent that at least a minute amount of dissolved oxygen, resulting from atmospheric absorption, will always be present in the water, wherefore the following reaction may be postulated:

(4) $$O_2 + 2H_2O + 4e \rightleftharpoons 4OH^-$$

If the reaction proceeds to the right, the wire yields electrons to the solution. If the reaction proceeds to the left, the wire acquires electrons from the solution.

The reaction of the above Equation 4 can proceed in neither direction, however, to any significant extent. If the reaction were to proceed to the right, the minute amount of available molecular oxygen would immediately be exhausted. If the reaction were to proceed to the left, only a minute concentration of $OH^-$ ion ($10^{-7}$ moles/liter) would be available, in neutral solution. Even if $OH^-$ were abundantly available in the latter case, molecular oxygen would be deposited on the wire surface. In all of these situations, an effectively and continuously maintained reaction is blocked or, expressed differently, polarization may be said to occur. When such a condition is established (effectively instantaneously), the ohmic resistance encountered by the competing reaction is effectively infinitely large, so that the interfering effect is completely nullified.

The principles of the present invention can be applied to other half-cells, reference electrodes, salt bridges, and other electrochemical apparatus, as will be evident to those skilled in the art, without departing from the spirit of the invention as defined in the appended claims.

I claim as my invention:

1. In an electrochemical testing apparatus, the combination of: a salt-bridge tube having a lower end portion submergible in a liquid medium to be tested, said lower end portion including liquid-junction means for discharging a minute stream of a salt solution from within said tube into said medium, said tube having a passage in the upper portion thereof for filling said tube with said salt solution and transmitting pressure thereto; and means providing a channel having an upper end communicating with said passage and a lower end open to and submergible in said liquid medium to entrap a body of gas and thereby transmit the pressure of said liquid medium at the depth of submergence to said salt solution.

2. In an electrochemical testing apparatus, the combination of: an upright salt-bridge tube adapted to contain a column of salt solution, said tube providing an upper portion including an opening communicating openly with the upper interior of said tube and with the top of any column of salt solution therein, said tube also providing a lower portion adapted to be submerged in a liquid medium to be tested, said lower portion including a liquid-junction means for discharging a minute stream of such salt solution from said column thereof into said liquid medium at a rate determined by the pressure differential between inner and outer portions of said liquid-junction means, said inner portion communicating directly with said salt solution and said outer portion communicating directly with said liquid medium; and walls forming an upright pressure-transmitting passage outside but paralleling said salt-bridge tube and providing an upper portion opening directly and openly on the interior of said upper portion of said salt-bridge tube through said opening thereof, said upright passage being open at its lower end to said liquid medium at a position near said liquid junction means.

3. In an electrochemical testing apparatus, the combination of: a salt-bridge tube providing a lower end portion submergible in a liquid medium to be tested, said lower end portion including liquid-junction means for discharging a minute stream of a salt solution from within said tube into said medium, said tube providing a passage means in the upper section thereof for filling said tube with said salt solution and transmitting pressure thereto; and a sheath around said tube to provide a gas space therearound, the lower end of said sheath being open to and submergible in said medium to entrap a body of gas in said gas space, the upper end of said gas space communicating with said passage means to transmit to said salt solution the pressure of said medium at the depth of submergence.

4. In an electrochemical testing apparatus for submergence in a liquid medium being tested, said apparatus including: a salt-bridge tube providing a lower end portion, said lower end portion including a liquid-junction means for discharging a minute stream of salt solution from within said tube into said medium; and a sheath around said tube, there being an annular chamber within said sheath around said tube, the lower end of said sheath being open to said liquid medium to entrap a body of gas in said annular chamber, said salt-bridge tube providing an opening for admitting said body of gas to the interior of such salt-bridge tube, whereby said body of gas entrapped by said sheath is adapted to separate and transmit pressure between said liquid medium and said salt solution.

5. An electrochemical testing apparatus as defined in claim 4 including pipe means for delivering additional gas to said annular chamber.

6. An electrochemical testing apparatus as defined in claim 4 in which said sheath provides peripherally-spaced dimples extending inwardly toward said salt-bridge tube to position the latter in said sheath.

7. In an electrochemical apparatus for making electrochemical measurements at a position submerged in a liquid medium and subject to change in pressure by said liquid medium, the combination of: a salt-bridge tube providing a lower end portion contactable by said liquid medium at said submerged position and having an opening spaced above said lower end portion for filling said tube with salt solution and transmitting pressure thereto, said salt bridge tube being adapted to contain a column of said salt solution with an upper surface between said lower end portion and said opening; a liquid-junction means carried by said lower end portion and comprising a minute fluid-conducting passage for discharging a minute stream of said salt solution from a lower portion of said column into said liquid medium when there is a small pressure differential across said liquid junction means; and pressure responsive means for maintaining said small pressure differential, irrespective of changes in pressure in said medium at said submerged position, said pressure-responsive means including walls defining a channel adapted to confine a body of fluid and pressurally communicating from the interior to the exterior of said tube through said opening to a position at substantially the level of said liquid-junction means.

8. In a pressure-compensating electrochemical testing apparatus, the combination of: a salt-bridge tube providing a lower end portion submergible in a liquid medium to be tested, said lower end portion providing means for discharging a minute stream of a salt solution from within said tube into said medium; a sheath around said tube and cooperating therewith to provide an annular chamber comprising upper and lower portions, said sheath and said tube being closer together in upper sections thereof than in lower sections thereof whereby said lower portion of said annular chamber is of relatively large cross-sectional area as compared with said upper portion of said annular chamber, said upper portion of said annular chamber communicating openly with the upper interior of said salt-bridge tube, the lower end of said sheath being open to the medium to be tested; and means for closing said upper portion of said annular chamber at a position above the point of communication between said upper portion of said annular chamber and the interior of said salt-bridge tube.

9. An apparatus as defined in claim 8 including a passage means between the interior of said salt-bridge tube and the exterior of said sheath, and means for normally closing said passage means.

10. In an electrochemical testing apparatus, the combination of: a salt-bridge tube providing a relatively large upper portion and a relatively small lower portion submergible in a liquid medium to be tested and including a liquid-junction means for discharging a minute stream of a salt solution from within said tube into said medium; a sheath open at its lower end to said liquid medium, said sheath being substantially tubular and surrounding said salt-bridge tube to provide an annular chamber of greater width opposite said lower portion of said tube than opposite said upper portion of said tube, the narrower portion of said annular chamber communicating with the interior of said tube; and a half-cell structure depending in said larger portion of said salt-bridge tube.

11. An electrochemical testing apparatus as defined in claim 10 in which the lower portion of said sheath provides peripherally-spaced dimples extending inwardly to restrain said lower portion of said salt-bridge tube from displacement.

12. In an electrochemical apparatus for making electrochemical measurements at a position submerged in a liquid medium even if the pressure of said liquid medium changes, the combination of: a salt-bridge tube providing a lower end portion contactable by said liquid medium at said submerged position and adapted to contain a column of salt solution having an upper surface, said salt-bridge tube providing a passage above said lower end portion; a liquid-junction means carried by said lower end portion and comprising a minute fluid-conducting passage for discharging a minute stream of said salt solution from a lower portion of said column into said liquid medium when there is a small pressure differential across said liquid-junction means; and pressure-responsive means for maintaining said small pressure differential irrespective of changes in pressure of said medium at said submerged position, said pressure-responsive means including a pressure-control tube adjoining said salt-bridge tube, said pressure-control tube providing a lower interior portion pressurally communicating with said liquid medium at a level near said liquid-junction means, said pressure-control tube providing an upper interior portion pressurally communicating with said passage provided by said salt-bridge tube, said pressure-control tube being adapted to contain a pressure-transmitting fluid body displaceable therein to increase and decrease the pressure on said surface as the pressure at said submerged position increases and decreases.

13. An electrochemical apparatus for making electrochemical measurements on a liquid medium, which apparatus uses a body of salt solution and a body of fluid through which pressure is transferred to said body of salt solution, said electrochemical apparatus including: a salt-bridge tube providing a lower end portion submergible in said liquid medium, said salt-bridge tube providing a zone adapted to contain said body of salt solution, said lower end portion including liquid junction means for discharging a minute stream of said salt solution from within said salt-bridge tube into said liquid medium, said tube having an upper portion providing an opening communicating with the top of said zone to transmit pressure to said body of salt solution; and walls defining a chamber adapted to entrap said body of fluid, said chamber having a lower portion responsive to external pressure at a level below said opening and having an upper portion communicating through said opening with said zone.

14. An electrochemical apparatus for making electrochemical measurements on a liquid medium, which apparatus uses a body of salt solution and a body of fluid through which pressure is transferred to said body of salt solution, said electrochemical apparatus including: a salt-bridge tube providing a lower end portion submergible in said liquid medium, said salt-bridge tube providing a zone adapted to contain said body of salt solution, said lower end portion including liquid junction means for discharging a minute stream of said salt solution from within said salt-bridge tube into said liquid medium, said tube having an upper portion providing an opening communicating with the top of said zone to transmit pressure to said body of salt solution; and a pressure-transfer tube providing an open lower end open to said liquid medium at a level near said liquid junction means, the upper interior of said pressure-transfer tube communicating through said opening with said zone of said salt-bridge tube, said pressure-transfer tube being adapted to confine said body of fluid between said liquid medium and said body of salt solution in pressure-transferring relationship.

15. In an electrochemical testing apparatus for submergence in a liquid medium being tested, said apparatus including: a salt-bridge tube providing a lower end portion, said lower end portion including a liquid-junction means; a sheath around said tube, there being an annular chamber within said sheath around said tube, the upper end of said tube providing a first opening communicating between said annular chamber and the interior of said tube, said sheath having a second opening aligned with said first opening, said first opening transmitting pressure between said annular chamber and the interior of said tube, said aligned openings forming a passage means from the exterior of said sheath to the interior of said tube; and means for closing said passage means.

16. An apparatus as defined in claim 15 in which said closing means includes a member encircling said sheath.

17. An electrochemical half-cell for use in making electrochemical measurements, said half-cell comprising: a wall separating two zones, one of said zones being an electrolyte zone; a tubular conductor made of an inert metal and traversing said wall, said tubular conductor providing a chamber having at one end an opening communicating between said chamber and said electrolyte zone; a mass of an electrochemically-sensitive metal in the other end of said chamber and providing an active surface; and a mass of a salt of said metal in said chamber in contact with said metal mass at said active surface and communicating with said electrolyte zone through said opening.

18. An electrochemical half-cell as defined in claim 17 in which said tubular conductor provides a portion having a surface exposed openly to said electrolyte zone to be in direct contact with the electrolyte therein.

19. An electrochemical half-cell comprising: a tube of an inert metal providing an opening; a mass of silver filling a portion of said tube at a position spaced from said opening, said mass providing an electrochemically-active surface; and a mass of a silver salt filling another portion of said tube in contact with said electrochemically-active surface and communicating with the exterior of said tube by way of said opening.

20. An electrochemical half-cell for use in making electrochemical measurements, said half-cell comprising: a tube of material of high electrical resistivity providing an internal zone, the zone outside said tube being an electrolyte zone; a small tube of inert metal sealed in a wall of said tube, said metallic tube traversing said wall and providing inner and outer portions exposed respectively to the interior of said first-named tube and said electrolyte zone, said metallic tube providing a chamber, one end of said metallic tube having an opening through which said chamber communicates with said electrolyte zone; a plug of an electrochemically-sensitive metal filling the other end of said chamber and providing an active surface; and a mass of a salt of said metal in said chamber in contact with said metal plug at said active surface and communicating with said electrolyte zone through said opening.

21. An electrochemical half-cell as defined in claim 20 in which said mass of said salt of said metal is a porous mass plugging said chamber at a position between said active surface and said opening.

22. An electrochemical half-cell comprising: a water-impervious wall separating two zones, one of said zones being an electrolyte zone; a conductor of an inert metal sealed in said wall with sections extending from opposite sides of said wall, one of said sections extending into said electrolyte zone; a coating of an electrochemically-active metal covering only a portion of said one section to leave another portion thereof openly exposed to said electrolyte zone; and a coating of a salt of said electrochemically-active metal covering at least a part of said metal coating and leaving exposed to said electrolyte zone at least a part of said other portion of said one section of said conductor.

23. A silver-silver chloride half-cell comprising: a wire of an inert metal having a section exposed to an electrolyte zone; a coating of silver covering a portion of said exposed section and leaving another portion thereof exposed to electrolyte in said zone; and a fused coating of silver chloride covering at least a part of said silver coating but leaving exposed to said electrolyte at least a part of said other portion of said wire.

References Cited in the file of this patent

UNITED STATES PATENTS

| Number | Name | Date |
|---|---|---|
| 1,807,821 | Behr | June 2, 1931 |
| 2,058,761 | Beckman et al. | Oct. 27, 1936 |
| 2,345,465 | Miles | Mar. 28, 1944 |

FOREIGN PATENTS

| Number | Country | Date |
|---|---|---|
| 551,598 | Great Britain | Mar. 2, 1943 |

OTHER REFERENCES

"Science," vol. 101, No. 2612 (Jan. 19, 1945), pp. 71–72, article by West et al.

"Journal of the American Chemical Society," vol. 58 (1936), page 1970.